United States Patent [19]

Bolgert

[11] Patent Number: 4,508,137

[45] Date of Patent: Apr. 2, 1985

[54] WALL MOUNTABLE VACUUM BREAKER

[75] Inventor: Edwin F. Bolgert, Kohler, Wis.

[73] Assignee: Kohler Co., Kohler, Wis.

[21] Appl. No.: 470,272

[22] Filed: Feb. 28, 1983

[51] Int. Cl.³ ............................................. F16K 24/04
[52] U.S. Cl. .................................... 137/218; 137/359; 137/360
[58] Field of Search ..................... 4/191; 137/215, 216, 137/217, 218, 359, 360, 382; 285/46

[56] References Cited

U.S. PATENT DOCUMENTS

| 886,888 | 5/1908 | Stewart | 285/46 X |
|---|---|---|---|
| 1,214,220 | 1/1917 | Regar | 285/46 X |
| 1,537,194 | 5/1925 | Rogers | 4/191 X |
| 1,725,987 | 8/1929 | Kersten | 285/46 |
| 2,684,082 | 7/1954 | Bletcher | 285/46 X |
| 3,105,707 | 10/1963 | Jacobson | 285/46 X |
| 3,155,106 | 11/1964 | Baron . | |
| 3,180,352 | 4/1965 | Kersten et al. | 137/218 |
| 3,286,721 | 11/1966 | Cravits | 137/218 |
| 3,724,487 | 4/1973 | Hunter . | |
| 4,080,980 | 3/1978 | Hunter . | |
| 4,326,671 | 4/1982 | Goguen . | |

FOREIGN PATENT DOCUMENTS

| 879678 | 6/1953 | Fed. Rep. of Germany | 137/359 |
|---|---|---|---|
| 1060226 | 3/1954 | France | 137/359 |
| 1264812 | 2/1972 | United Kingdom | 137/217 |

OTHER PUBLICATIONS

Two Pages of Kohler Co. Drawings Dated 4-5-66, Depicting the K-13055 Vacuum Breaker, Admitted Prior Art.

Primary Examiner—Gerald A. Michalsky
Attorney, Agent, or Firm—Quarles & Brady

[57] ABSTRACT

A wall mountable vacuum breaker is disclosed. In one embodiment, there is an escutcheon mountable against the wall over a wall opening, the escutcheon having openings alignable with fluid supply and outlet pipes which terminate near the opening. There are also a pair of couplings connectable to the respective pipes through the escutcheon, with at least one of the couplings being shaped so as to bear against an outwardly facing surface of the escutcheon when the coupling is connected to the pipe. This holds the escutcheon against the wall. A fastener is provided to connect the main valve body to the respective couplings. In an especially preferred embodiment, there is provided a decorative shroud that is removably mounted to the valve body so as to enclose the valve body and the fastener.

4 Claims, 7 Drawing Figures

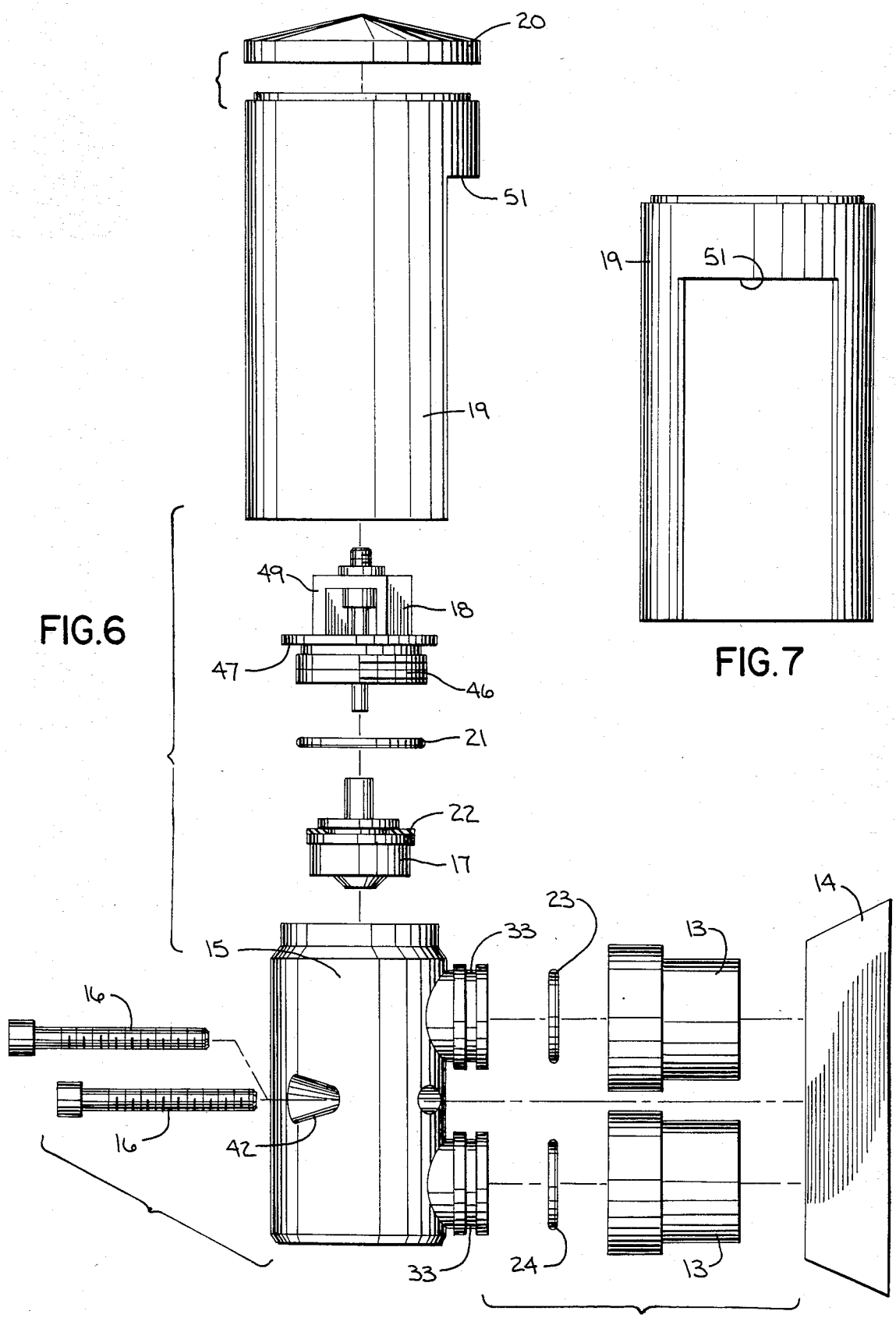

WALL MOUNTABLE VACUUM BREAKER

BACKGROUND OF THE INVENTION

A. Field of the Invention

The present invention relates to vacuum breakers that are used primarily in connection with indoor plumbing systems. It is especially useful where the vacuum breaker is mounted on a wall and the appearance of the vacuum breaker is very important.

B. Description of the Art

Many devices which require a water supply (e.g. dishwashers, washing machines, swimming pool fillers, whirlpool tubs, garden watering systems and water closets) need some protection upstream of the device so a supply line break will not draw contaminated water back out of the device. This is especially important, for example, in high rise buildings, where if a supply pipe were to break on the first floor, much of the contaminated water from toilet tanks and other fixtures on the upper floors of the building might backflow to the lower floors.

While prior art vacuum breaker assemblies usually do serve to protect against backflows, they have a number of other problems. For example, because these vacuum breakers are so bulky, they often have a very ugly appearance, and they take up unnecessary amounts of wall space. Also, it is possible that one of the many protruding parts of these assemblies can cause injury to an inattentive person if the person were to bump against them.

Any attempt to minimize these problems by locating the vacuum breaker behind a wall during the initial construction of a building will only create a further problem of how necessary access to the vacuum breaker can be maintained without incurring substantial expense. Such access is needed because conventional vacuum breakers can from time to time require replacement of seals or removal of sediment collected in the breaker.

Another problem with prior art vacuum breakers is that they are often difficult and expensive to install. This is because they usually required the plumber to prelocate wall piping at various depths relative to the wall, and at fixed horizontal and vertical relationships to each other. Further, such prior art systems can be susceptible to leakage problems because they require the plumber to make many joints. Therefore, it can be seen that the need has existed for a vacuum breaker which improves upon prior art vacuum breakers in dealing with these problems.

SUMMARY OF THE INVENTION

The present invention relates to a wall mountable vacuum breaker having a valve body with inlet and outlet ports that are connectable to fluid supply and outlet pipes that terminate near an opening in the wall. In one aspect of the invention, there is an escutcheon mountable against the wall and having an opening that is alignable with the pipes. A pair of couplings are connectable to the respective pipes through the escutcheon opening, at least one of the couplings being shaped so as to bear against an outwardly facing surface of the escutcheon when it is connected to the pipe. There is also provided means connecting the valve body inlet and outlet ports to the respective couplings.

In another aspect of the invention, there is provided a vacuum breaker connectable to a fluid supply pipe and a fluid outlet pipe, both of the pipes being positioned adjacent to an opening in the wall. In this embodiment, there is an escutcheon mounted against the wall, the escutcheon having an inlet hole which is alignable with the fluid supply pipe, and an outlet hole which is alignable with the fluid outlet pipe. Two coupling members are provided. One of the coupling members is alignable with the inlet hole in the escutcheon so as to be connectable to the fluid supply pipe, and the other coupling member is alignable with the outlet hole in the escutcheon so as to be connectable to the fluid outlet pipe.

At least one of the coupling members abuts the outer surface of the escutcheon to hold the escutcheon against the wall, and both of the coupling members have a through bore to allow the flow of fluid through the coupling members. There is also a valve body having an inlet port coupled to one coupling member, and an outlet port coupled to the other coupling member, the valve body also having a channel that connects the inlet port to the outlet port and a valve in that channel. Means for retaining the valve body in coupled relation with the coupling members are also provided.

In an especially preferred embodiment, the valve body ports are longitudinally and circumferentially aligned with respect to each other, and there is a reciprocating valve member in the valve body that moves along a line which is substantially perpendicular to both of the ports. When the escutcheon is mounted on a substantially vertical wall, the valve member is therefore biased by gravity towards its closed position.

In another especially preferred form, each coupling has a threaded inner end for connection to a respective pipe, and a non-circular intermediate portion defining a tool socket for threading the coupling to the pipes. Also, the valve body ports are releasably connected to the respective couplings through use of port stubs received in outer bore portions of the couplings with a friction fit, and a releasable fastener means extends between the valve body and the escutcheon.

To make the assembly even more decorative, a shroud can be provided which is removably mounted on the valve body so that it encloses the valve body and fastening means. In one form, the decorative shroud is substantially cylindrical, and has an axial cut-out extending from a bottom edge of the shroud part way up a side of the shroud.

Through use of the present invention, a vacuum breaker which is extremely compact and highly decorative can be mounted on a wall. There are no protruding parts which could easily be bumped against. All exposed pipe nipples, flanges, ground joints, nuts, and elbows used in a conventional vacuum breaker are no longer required.

Moreover, the present invention is extremely easy to install. The plumber merely prelocates the supply and outlet pipes flush with the face of the wall and in vertical alignment with each other. The plumber needs to seal only two joints. Thus, there is less risk of leakage than there is with vacuum breakers that require the plumber to make four or more joints.

It might also be noted that the design allows the use of very cost effective manufacturing techniques. Most of the parts can be made of very inexpensive metals such as bar stock or tubing which permit rapid machining with minimum tooling investment.

The objects of the invention therefore include:

(a) providing a vacuum breaker of the above kind which is compact, attractive, and has few protruding parts;

(b) providing a vacuum breaker of the above kind which is mountable on a vertical wall;

(c) providing a vacuum breaker of the above kind which is inexpensive to install and has little risk of leakage; and (d) providing a vacuum breaker of the above kind which is relatively inexpensive to produce.

These and still other objects and advantages of the invention will be apparent from the description which follows. In the following description, the preferred embodiment of the invention will be disclosed with reference to the accompanying drawings. These embodiments do not represent the full scope of the invention, but rather the invention may be employed in other embodiments. Reference is therefore made to the claims herein for interpreting the scope of the present invention.

BRIEF DESCRIPTION OF THE DRAWINGS

FIG. 6 is an exploded elevational view of the assembly of FIG. 1; and

FIG. 7 is a rear elevational view of the shroud shown in FIG. 6.

DESCRIPTION OF THE PREFERRED EMBODIMENT

Figure 1:
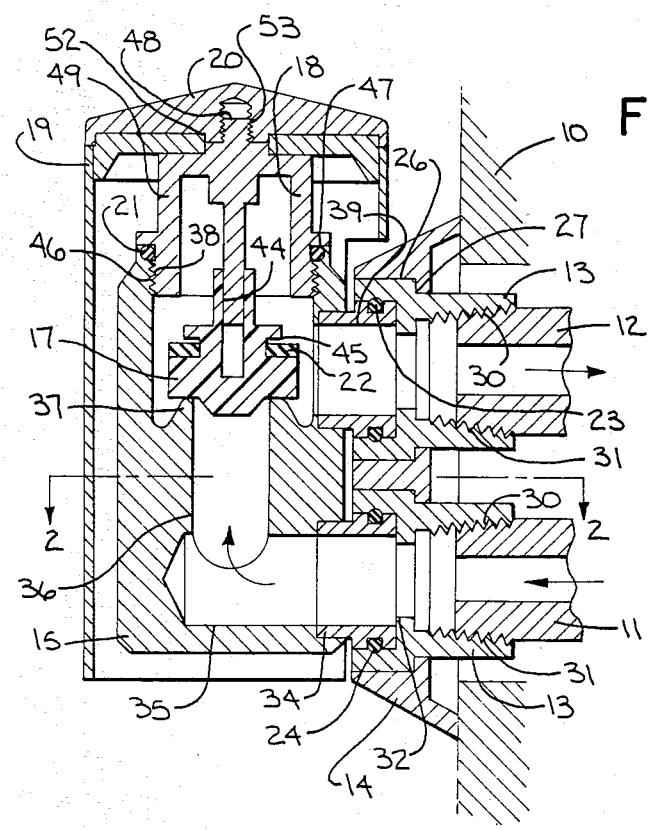
FIG. 1 is a cross sectional view of a vacuum breaker embodying the present invention that has been mounted on a wall.

In FIG. 1 there is shown a vertical wall 10 with a water inlet pipe 11 and a water outlet pipe 12 that have been positioned by the plumber so as to terminate near an opening in the wall. The wall opening can be a single uninterrupted opening, or it can be formed in two segments, one for each pipe.

Water will normally be supplied through the supply or inlet pipe 11, and water that has passed through the vacuum breaker will then pass through outlet pipe 12 to a plumbing device such as a toilet (not shown). Coupling members 13, escutcheon 14, valve body 15, fastening screws 16, check valve 17, retainer 18, decorative shroud 19, and cap 20 form the vacuum breaker. There are also provided O-rings 21, 23 and 24, and gasket 22.

Figure 3:
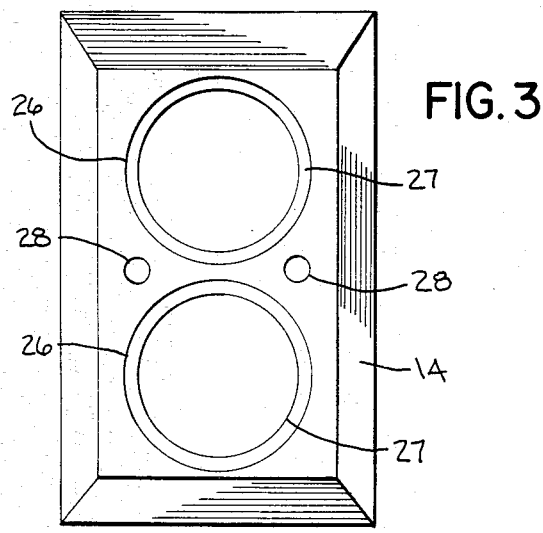
FIG. 3 is a front elevational view of the escutcheon shown in FIG. 1.

As best seen in FIGS. 1 and 3, the escutcheon 14 is mountable against the wall 10. It has a pair of openings 26 which are alignable with the pipes 11 and 12. The lower opening 26 is an inlet hole which is alignable with the fluid supply pipe 11, and the upper hole 26 is an outlet hole which is alignable with the fluid outlet pipe 12. Rather than using two distinct holes 26 in the escutcheon 14 as shown in FIG. 3, an appropriately shaped single hole may also suffice. Thus, the word "opening", when used with reference to the escutcheon, can refer to two separate holes, or to a single hole. Also provided in the escutcheon 14, are outwardly facing surfaces 27 which surround the holes 26, and a pair of threaded screw holes 28.

Figure 4:
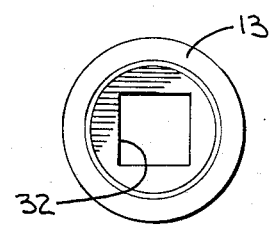
FIG. 4 is a front elevational view of one of the coupling members shown in FIG. 1.

The coupling members 13 are connectable to the respective pipes 11 and 12 through the escutcheon openings 26. Each coupling 13 has a through bore 30 that has an inner threaded end 31 for connection to a respective thread end of a pipe. The couplings 13 also have a non-circular intermediate portion 32 (see FIG. 4) defining a tool socket. It will be noted that when the couplings 13 are assembled as shown in FIG. 1, a flange of the coupling bears against the outwardly facing surface 27 of the escutcheon 14, so as to sandwich and thereby hold the escutcheon 14 against the wall 10.

Figure 5:
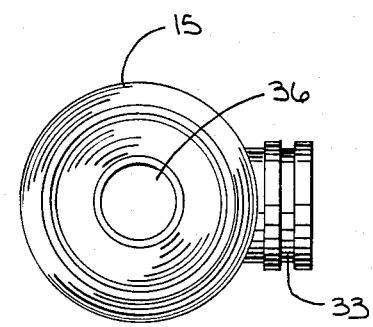
FIG. 5 is a top plan view of the valve body shown in FIG. 1.

Turning next to the valve body 15, inlet and outlet port stubs 33 (see FIG. 5) are received in cylindrical outer bore portions of the couplings 13 with a friction fit. The stubs 33 can be made integral with the valve body 15, or in the preferred embodiment, they can be separately formed and brazed into suitable receiving cups 34 on the valve body 15.

Figure 2:
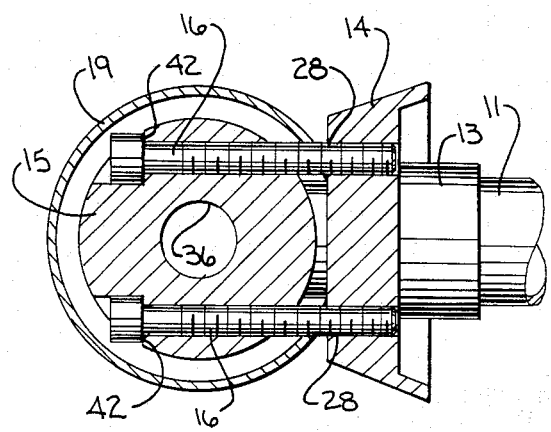
FIG. 2 is a sectional view taken along the line 2—2 in FIG. 1.

The valve body has a horizontal channel 35 which extends into a vertical channel 36. The vertical channel 36 terminates at the valve seat 37. Above the valve seat 37, there is a chamber that has threads 38 formed at its upper end. There is also a horizontal channel 39 which extends from the chamber to the outlet port stub 33. Also, as best seen in FIGS. 2 and 6, screw holes 42 are formed along the sides of the valve body. The ends of the screw holes 42 are enlarged so as to form recesses for the screw heads.

Turning now to check valve 17, there is an axial guide bore 44 which extends part way into the top of the check valve. Also, a slot 45 is formed around the circumference of the check valve 17 for retaining the gasket 22.

Retainer 18 is best seen by viewing FIGS. 1 and 6. The retainer has a threaded lower end 46 which is threaded to the threads 38 formed at the upper end of the chamber. There is also formed a shoulder 47 for retaining the O-ring 21, a stem 48 which is threaded at its upper end and is smooth at its lower end, and a support arch 49. The lower end of the stem 48 is of a size that reciprocally telescopes inside the axial guide bore 44 in the check valve 17. This allows the check valve 17 to ride on the stem 48 from the position shown in FIG. 1, to a position in which the gasket 22 seals against the lower surface of the retainer 18.

Turning next to the decorative coverings, the shroud 19 is substantially cylindrical and has an axial cut-out 51 extending from the bottom edge of the shroud 19 part way up the back side of the shroud, and a top opening 52. The cap 20 has a screw threaded hole 53. The hole 53 is suitable to mesh with the screw threads at the top end of the retainer stem 48.

To mount the vacuum breaker on a wall, the escutcheon 14 is placed over the pipes 11 and 12 so that the openings 26 in the escutcheon are aligned with the pipes. The coupling members 13 are then screwed onto the pipes (through the escutcheon openings), until the coupling members abut against the surface 27 of the escutcheon 14. To assist in making an even tighter connection, a rectangular tool can be inserted into the tool socket 32 of the couplings 13 to assist in tightening the couplings on the pipes.

The valve body is preassembled with O-rings 23 and 24 on stubs 33. The check valve 17 can then be positioned in bore 36 with the gasket 22 thereon, and the retainer (with O-ring 21) can then be screwed down into the threaded ends 38.

The stubs 33 are then firmly pushed into the couplings 13 until they are in the position shown in FIG. 1. The O-rings 23 and 24 then provide a seal between the stubs and the coupling. While the friction fit between the stubs and the coupling might hold the parts in position for a short period of time, a much more secure fastening is achieved by inserting screws 16 through the holes 42 of the valve body, and then inserting the screws 16 into the threaded holes 28 in the escutcheon.

The shroud 19 is then positioned over the retainer 18 with a hole 52 of the shroud 19 placed over the top threaded portion of the stem 48. The stem 48 then projects through the hole 52. The cap 20 is then screwed down onto the stem 48 so as to sandwich the shroud 19 in between. It should be noted that the cutout 51 on the shroud is formed so that the shroud can clear the couplings.

In normal operation, water pressure coming from the inlet pipe will force the check valve 17 upward, so that the gasket 22 seals against the bottom of the retainer 18. Water can then flow out the pipe 12. Should there be a break in the supply of water upstream of the vacuum breaker, the resulting vacuum in pipe 11, assisted by gravity, will rapidly bring the check valve 17 down to the seat 37, thereby isolating the outlet pipe 12 from the vacuum.

In the rare event that some piece of sediment should prevent the check valve 17 from completely closing, air will be fed into the system from the bottom of the shroud 19, up to the top of the shroud, then through the open sides of the support arch 49, and then down into vertical channel 36. This air will then relieve the vacuum.

Thus, the present invention provides a highly compact and decorative vacuum breaker which is relatively inexpensive to produce and install, and which minimizes the risk of someone bumping into a protruding pipe or nipple. If sediment must be removed from the valve, or if a seal needs to be replaced on the vacuum breaker, one can easily gain access to the inside of the vacuum breaker by simply unscrewing the cap, removing the shroud, and unscrewing the retainer.

It should be noted that in addition to the specific embodiments shown, the invention can exist in other embodiments. For example, it is not critical that both couplings bear against the escutcheon. One can suffice to hold the escutcheon against the wall. Nor is it critical that the shroud extend all the way down below the valve body, although this is usually desirable from a decorative standpoint.

Thus, there may be various modifications and changes in the embodiments which have been shown which are within the scope of the invention. Such modifications and changes are meant to be within the scope of this application. As such, the invention should not be limited by the illustrative description above.

I claim:

1. In a vacuum breaker connectable to a fluid supply pipe and a fluid outlet pipe, ends of both of the pipes being in substantial alignment with respect to each other and being positioned adjacent to an opening in a substantially vertical wall, the combination comprising:
   an escutcheon mountable against the wall, the escutcheon having an inlet hole which is alignable with the fluid supply pipe, and an outlet hole which is alignable with the fluid outlet pipe;
   two coupling members, one of the coupling members being alignable with the inlet hole in the escutcheon so as to be connectable to the fluid supply pipe, and the other coupling member being alignable with the outlet hole in the escutcheon so as to be connectable with the fluid outlet pipe;
   at least one of the coupling members abutting against the outer surface of the escutcheon so as to be able to hold the escutcheon against the wall, and both of the coupling members having a through bore to allow the flow of fluid through the coupling members;
   a vacuum breaker valve body having an inlet port coupled to one coupling member and an outlet port coupled to the other coupling member, the vacuum breaker valve body also having a channel that connects the inlet port to the outlet port and a vacuum breaker valve in that channel; and
   means for retaining the vacuum breaker valve body in a coupled relation with the coupling members.

2. The vacuum breaker of claim 1, wherein each of said ports telescopes with a coupling member, with a radial periphery o-ring seal positioned therebetween, whereby the ports and couplings are frictionally assembled together.

3. The vacuum breaker of claim 1, wherein the retaining means acts between the vacuum breaker valve body and the escutcheon.

4. The vacuum breaker of claim 3, wherein the retaining means projects through the vacuum breaker valve body.

* * * * *